United States Patent
Kandhasamy et al.

(10) Patent No.: US 11,781,022 B1
(45) Date of Patent: Oct. 10, 2023

(54) ANTI-CORROSION COATING COMPOSITIONS AND METHODS FOR THE SAME

(71) Applicant: The Boeing Company, Chicago, IL (US)

(72) Inventors: Kamaraj Kandhasamy, Karnataka (IN); Kishora Shetty, Karnataka (IN)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 17/883,306

(22) Filed: Aug. 8, 2022

(51) Int. Cl.
| | | |
|---|---|---|
| C09D 5/08 | (2006.01) | |
| C09D 5/24 | (2006.01) | |
| C09D 7/65 | (2018.01) | |
| C09D 7/61 | (2018.01) | |
| C09D 163/00 | (2006.01) | |

(52) U.S. Cl.
CPC .............. *C09D 5/08* (2013.01); *C09D 5/24* (2013.01); *C09D 7/61* (2018.01); *C09D 7/65* (2018.01); *C09D 163/00* (2013.01)

(58) Field of Classification Search
CPC ... C09D 5/08; C09D 5/24; C09D 7/61; C09D 7/65; C09D 163/00
See application file for complete search history.

(56) References Cited

U.S. PATENT DOCUMENTS

| | | | | |
|---|---|---|---|---|
| 6,972,098 B1 * | 12/2005 | Viswanathan | ......... | C09D 5/038 |
| | | | | 427/388.1 |
| 10,464,680 B2 | 11/2019 | Kinlen et al. | | |
| 10,669,033 B2 | 6/2020 | Kinlen et al. | | |
| 11,059,594 B2 | 7/2021 | Kinlen et al. | | |
| 2008/0265217 A1 * | 10/2008 | Horton | ............ | C23F 13/06 |
| | | | | 252/503 |
| 2015/0184304 A1 * | 7/2015 | Kumar | ............ | C09D 7/65 |
| | | | | 252/500 |

OTHER PUBLICATIONS

Aziz et al., "Diglycidyl Ether of Bisphenol A/Chitosan-Graft-Polyaniline Composites With Electromagnetic Interference Shielding Properties: Synthesis, Characterization, and Curing Kinetics," Polymer Engineering and Science, 2019, p. 372-381.

Karpakam et al., "Electrosynthesis of Polyaniline-Molybdate Coating on Steel and its Corrosion Protection Performance," Electrochimica Acta 56 (2011) 2165-2173.

Maity et al., "Conducting Polymer Grafting: Recent and Key Developments," Polymers 2020, 12, 709, 23 pages.

(Continued)

*Primary Examiner* — Mark Kopec
*Assistant Examiner* — Jaison P Thomas
(74) *Attorney, Agent, or Firm* — MH2 Technology Law Group LLP (57) ABSTRACT

An anti-corrosive coating composition is disclosed. The anti-corrosive coating composition includes a binder, an electrically conducting polymer, one or more fillers, and a crosslinker. The electrically conductive polymer may include polyaniline, poly(3,4-ethylenedioxythiophene), polypyrrole, or an additive, such as a biopolymer grafted thereto. A method for making an anti-corrosive coating composition is also disclosed.

20 Claims, 2 Drawing Sheets

(56) References Cited

OTHER PUBLICATIONS

Silva et al., "New Insights in Adhesive Properties of Hybrid Epoxy-Silane Coatings for Aluminum Substrates: E''ect of Composition and Preparation Methods," Journal of Inorganic and Organometallic Polymers and Materials (2020) 30:3105-3115.
Ocon et al., "Corrosion performance of conducting polymer coatings applied on mild steel," Corrosion Science 47 (2005) 649-662.
Rohwerder et al., "Conducting polymers for corrosion protection: What makes the difference between failure and success?," Electrochimica Acta 53 (2007) 1300-1313.

* cited by examiner

ANTI-CORROSION COATING COMPOSITIONS AND METHODS FOR THE SAME

TECHNICAL FIELD

The present disclosure generally relates to the field of coating compositions having anti-corrosion properties. More particularly, the present disclosure relates to compositions for anti-corrosion coatings including conductive polymers and methods for making the same.

BACKGROUND

Corrosion prevention is a critical design requirement in metallic components, particularly within vehicles such as marine vessels such as boats, ships, or submarines, military aircrafts, commercial aircrafts, or other marine atmosphere applications. One method for the prevention of metal corrosion is with the use of corrosion protective coatings. Zinc chromate or other chromates are commonly used corrosion resistant pigments that are added to such coatings. However, it is desired to decrease usage of these materials to meet environmental, health and safety regulations, and to limit their future introduction into the environment.

It is of further interest that anti-corrosive coatings are long lasting when subjected to various use environmental conditions. Anti-corrosive coatings having a self-healing effect, where the primary functionality of such a coating is preserved as the coating wears or endures various use environments, would benefit from such a protective coating system or coating matrix design. Environmentally friendly, anti-corrosive coatings could find wide utility in various applications, such as ships, boats, sub-marines, military aircrafts and commercial aircrafts for corrosion prevention including that operate in marine atmospheres. Therefore, there is a need for well-dispersed, self-healing, tunable surface coatings having improved anti-corrosive properties and the methods to fabricate and apply such anti-corrosive coatings.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

Examples of the disclosure provide a self-healing anti-corrosive coating composition. The self-healing anti-corrosive coating composition also includes a binder. The self-healing anti-corrosive coating composition also includes an electrically conducting polymer. The self-healing anti-corrosive coating composition also includes one or more fillers. The self-healing anti-corrosive coating composition also includes a crosslinker.

Implementations of the self-healing anti-corrosive coating composition include where the binder is an epoxy-functional binder. The epoxy-functional binder may be a bisphenol A diglycidyl ether. The binder may include an acrylic, a polyurethane, a polysiloxane, a polycarbonate, or a combination thereof. The electrically conductive polymer may include polyaniline. The electrically conductive polymer may include poly(3,4-ethylenedioxythiophene). The electrically conductive polymer may include polypyrrole. The electrically conductive polymer further may include a biopolymer grafted to a polyaniline. The biopolymer may include chitosan. The electrically conductive polymer may include a grafted conductive polymer. The grafted conductive polymer may include polyaniline and a silane, an acid, an acrylamide, a non-conductive polymer, or a combination thereof. The one or more fillers are selected from a group including titanium dioxide, talc, mica, silicon dioxide, and aluminum stearate, and combinations thereof.

Examples of the disclosure provide another self-healing anti-corrosive coating composition. The self-healing anti-corrosive coating composition also includes a binder. The self-healing anti-corrosive coating composition also includes an electrically conducting grafted polymer including polyaniline and a compound grafted thereto. The self-healing anti-corrosive coating composition also includes one or more fillers.

Implementations of the self-healing anti-corrosive coating composition include where the compound may include a biopolymer. The compound may include a silane, an acid, an acrylamide, a non-conductive polymer or a combination thereof. The one or more fillers are selected from a group including titanium dioxide, talc, mica, silicon dioxide, and aluminum stearate, and combinations thereof.

Examples of the disclosure provide a method for making a self-healing anti-corrosive coating composition. The method for making a self-healing anti-corrosive coating composition includes contacting a first polymer, a conductive polymer, one or more fillers, and one or more solvents with one another to prepare a self-healing anti-corrosive coating precursor and homogenizing the anti-corrosive coating precursor. The method for making a self-healing anti-corrosive coating composition also includes contacting the anti-corrosive coating precursor with a crosslinker. The method for making a self-healing anti-corrosive coating composition also includes homogenizing the anti-corrosive coating precursor and the crosslinker and curing the anti-corrosive coating composition.

The method for making a self-healing anti-corrosive coating composition may include grafting a second polymer to the conductive polymer prior to contacting the first polymer. The second polymer may be a biopolymer. Curing the self-healing anti-corrosive coating composition further may include heating the self-healing anti-corrosive coating composition, drying the self-healing anti-corrosive coating composition in air, providing UV radiation to the self-healing anti-corrosive coating composition, or a combination thereof.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

Marine environments, because of high salinity, can present an extremely aggressive corrosive setting for metals and alloys. The mechanism of corrosion in seawater, and in other aggressive environments, is electrochemical in nature. Protective coating is one of the primary corrosion prevention methods which acts as barrier between a material and its service environment. Corrosion inhibitive pigments, which may be added into some coatings may act as a secondary corrosion inhibitive system by providing localized corrosion prevention. Examples of the present disclosure include the development of environmentally friendly coating systems for marine applications and any other such applications requiring primarily corrosion protection. Examples include multifunctional, smart self-healing coatings containing intrinsically conducting polymers.

While zinc chromate or other chromates may find common use as corrosion resistant pigments within such coatings, these inhibitors also have detrimental effects on environment, when released in substantial amounts. Due to their toxic and carcinogenic nature the usage of such pigments should be progressively decreased to meet environmental, health and safety regulations. Hence, alternate approaches of the present disclosure provide environmentally friendly coatings for protection, especially for marine applications. Exemplary examples of anti-corrosive coating formulations described in the present disclosure include several key features. By nature of the design, smart, self-healing activity is embedded in the coating framework or matrix, and thus the self-healing activity is retained throughout the coating matrix, particularly as wear occurs at the coating surface, maintaining performance of the coating as it is homogeneously distributed in the coating matrix. Furthermore, minimization of loading of solid pigments added for corrosion prevention in the coating can be realized, and avoidance of issues related to gravitational pigment settling. Additionally, the corrosion resistance of coatings can be tuned by using specific polymer networks which will improve the curing mechanism and self-healing effect of the anti-corrosive coating. Disclosed herein is a coating system with primary functionalities of anti-corrosion and self-healing. Coatings as disclosed herein include smart protection from self-healing and smart activity from intrinsically conducting polymers in the protective coating system. The disclosed compositions and methods rely upon the self-healing ability of the coating matrix which has an embedded conducting polymer network, enabling improved performance due to homogenous distribution of the self-healing coating system, tunability of electrically conducting properties, and minimization of environmentally hazardous additives. Exemplary anti-corrosive coating formulations as described herein may be applied to sea-faring or marine vessels such as ships, boats, sub-marines, or alternatively military aircrafts, commercial aircrafts, or amphibious or land vehicles for corrosion prevention inclusive of any vehicle that may operate in a marine atmosphere.

Exemplary examples of the present disclosure include formulations of a self-healing anti-corrosive coating composition, including a binder, an electrically conducting polymer, one or more fillers, and a crosslinker. The binder may be an epoxy-functional binder, such as a bisphenol A diglycidyl ether, an acrylic, a polyurethane, a polysiloxane, a polycarbonate, or a combination thereof. The electrically conductive polymer of the anti-corrosive coating composition may include polyaniline, poly(3,4-ethylenedioxythiophene), or polypyrrole. The electrically conductive polymer of the anti-corrosive coating composition may include a biopolymer, such as chitosan, grafted to a polyaniline. The electrically conductive polymer in the anti-corrosive coating composition may be a grafted conductive polymer, where the grafted conductive polymer is polyaniline and a silane, an acid, an acrylamide, a non-conductive polymer or a combination thereof. One or more fillers incorporated into the anti-corrosive coating composition can be selected from a group consisting of titanium dioxide, talc, mica, silicon dioxide, and aluminum stearate.

Figure 1:
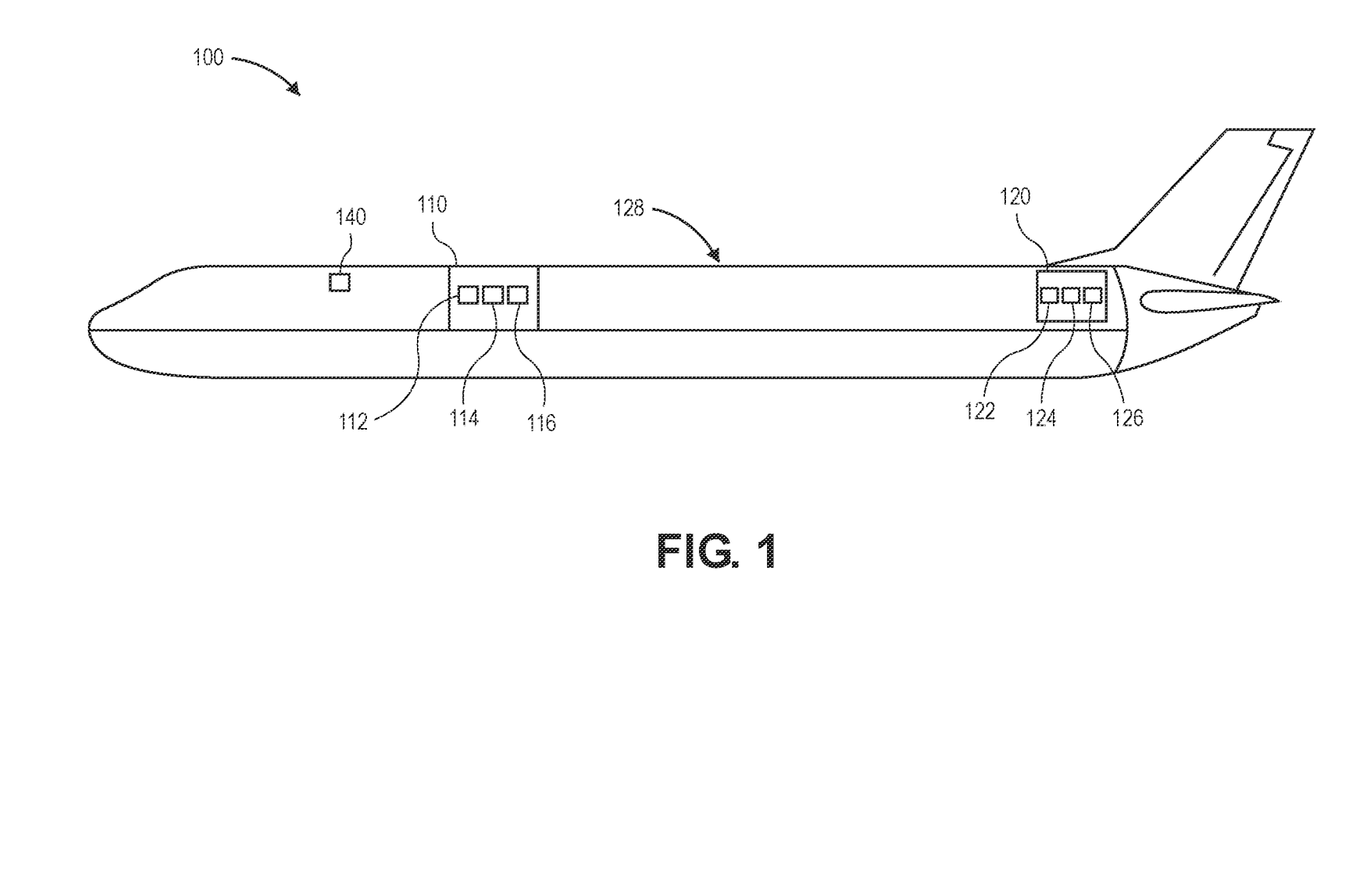
FIG. 1 illustrates a schematic view of a vehicle, in accordance with the present disclosure.

In some examples, a self-healing anti-corrosive coating composition or formulation can be applied to protect a substrate and other layers or portions of a vehicle 100 from the environment. FIG. 1 illustrates a schematic view of a vehicle 100, according to an implementation. As shown, the vehicle 100 may include an airplane. The vehicle 100 may also or instead include other types of aircrafts such as helicopters, unmanned aerial vehicles (UAVs), spacecrafts, or the like. In other implementations, the vehicle 100 may be or include a car, a boat, a train, or the like. In yet other implementations, the system and method described below may not be implemented in a vehicle, and rather may be implemented in a building.

The vehicle 100 may include one or more lavatories (one is shown: 110). The lavatory 110 may include a sink 112, a toilet 114, and a sensor 116. The sensor 116 may sense/determine whether the lavatory 110 is occupied (e.g., by a passenger) or unoccupied. For example, the sensor 116 may be or include a motion sensor. The vehicle 100 may also include one or more kitchens or galleys (one is shown: 120). The kitchen 120 may include a sink 122, a dishwasher 124, and an ice maker 126. On one or more external surfaces or components of the vehicle 100, a self-healing anti-corrosive coating composition 128 may be applied to prevent or resist corrosion when exposed to a variety of harsh environmental conditions.

The self-healing anti-corrosive coating formulation may include, for example, a resin or polymer material. Example resin materials include epoxy, thermoplastic resins, acrylics, polyurethanes, polysiloxanes or silicone resins, or polycarbonate resins. Some resins may be characterized by being durable and operable at high temperatures.

Epoxies comprise partially cured epoxies, a particular addition of epoxies, two-component epoxy resin that includes a catalyst (such as HYSOL® EA 956 epoxy resin available from Henkel Corporation of Bay Point, Calif), a two liquid system that includes both a resin and a hardener, or crosslinker (such as EPOFIX resin available from Struers A/S of Ballerup, Denmark), triglycidyl ethers of aminophenol (such as Araldite MY 0500 or MY 0510 from Huntsman Advanced Materials (Monthey, Switzerland)), tetrafunctional epoxies such as N,N,N',N'-tetraglycidyl-m-xylenediamines (such as Araldite MY0720 or MY0721 from Huntsman Advanced Materials (Monthey, Switzerland)), and mixtures thereof. Epoxies also comprise a difunctional epoxy, such a Bisphenol-A (Bis-A) or Bisphenol-F (Bis-F)-based epoxies. Bis-A epoxy resin is available commercially as Araldite GY6010 (Huntsman Advanced Materials) or DER 331, which is available from Dow Chemical Company (Midland, Mich.). A Bis-F epoxy resin is available commercially as Araldite GY281 and GY285 (Huntsman Advanced Materials). Epoxies, for example, are suitable for thermosets on the outside of aircraft and other vehicles because they are generally durable when used in typical service conditions and environments.

The one or more epoxies or binder resins can be present in an amount of from about 40 weight %, about 50 weight %, about 60 weight %, about 70 weight %, or about 75 weight %, based on a total weight of the anti-corrosive coating composition. For example, the one or more epoxies or binder resins can be present in an amount of from about 40 weight % to about 75 weight %, about 50 weight % to about 75 weight %, or about 60 weight % to about 70 weight %, based on a total weight of the anti-corrosive coating formulation.

In an example self-healing anti-corrosive coating composition, the hardener or crosslinker associated with or corresponding to the epoxy or binder resin can be present in an amount of from about 10 weight %, about 20 weight %, about 30 weight %, about 30 weight %, or about 50 weight %, based on a total weight of the anti-corrosive coating composition. In another example, the hardener or crosslinker can be present in an amount of from about 10 weight % to about 50 weight %, about 10 weight % to about 30 weight %, or about 10 weight % to about 20 weight %.

Acrylates comprise, for example, a polyacrylate of Formula (I):

(where x is a positive integer, such as between about 10 and about 10,000) and/or salts thereof. R1 and R2 is independently C1-C20 alkyl or C1-C20 hydroxyalkyl. In at least one aspect, R2 is methyl. Acrylates comprise hydroxyalkyl polyacrylates, hydroxyalkyl polymethacrylates, alkyl polyacrylates, and alkyl polymethacrylates. Examples of suitable hydroxyalkyl polyacrylates, or hydroxyalkyl polymethacrylates comprise poly(2-hydroxyethyl acrylate), poly(2-hydroxy-1-methylethyl acrylate), poly(2-hydroxypropyl acrylate), poly(3-hydroxypropyl acrylate), poly(2-hydroxybutyl acrylate), poly(4-hydroxybutyl acrylate), poly(2-hydroxyethyl methacrylate), poly(2-hydroxy-1-methylethyl methacrylate), poly(2-hydroxypropyl methacrylate), poly(3-hydroxypropyl acrylate), poly(2-hydroxybutyl methacrylate), poly(4-hydroxybutyl methacrylate) and the like, and acrylic acid or methacrylic acid esters of ethylene glycol and propylene glycol such as poly(diethylene glycol acrylate), and the like. Also useful are hydroxy-containing esters and/or amides of unsaturated acids such as maleic acid, fumaric acid, itaconic acid, and the like. In at least one aspect, a hydroxy-acrylic polymer is made of from 5 percent to 35 percent by weight of monoethylenically unsaturated hydroxy-containing monomers based on total acrylate weight, and in certain embodiments from 10 percent to 25 percent by weight. Suitable alkyl polyacrylates and polymethacrylates comprise poly(methyl acrylate), poly(ethyl acrylate), poly(propyl acrylate), poly(isopropyl acrylate), poly(butyl acrylate), poly(isobutyl acrylate), poly(hexyl acrylate), poly(2-ethylhexyl acrylate), poly(nonyl acrylate), poly(lauryl acrylate), poly(stearyl acrylate), poly(cyclohexyl acrylate), poly(isodecyl acrylate), poly(phenyl acrylate), poly(isobornyl acrylate), poly(methyl methacrylate), poly(ethyl methacrylate), poly(propyl methacrylate), poly(isopropyl methacrylate), poly(butyl methacrylate), poly(isobutyl methacrylate), poly(hexyl methacrylate), poly(2-ethylhexyl methacrylate), poly(nonyl methacrylate), poly(lauryl methacrylate), poly(stearyl methacrylate), poly(cyclohexyl methacrylate), poly(isodecyl methacrylate), poly(phenyl methacrylate), poly(isobornyl methacrylate), and the like.

The one or more acrylics can be present in an amount of from about 25 weight % to about 95 weight %, based on a total weight of the anti-corrosive coating formulation. For example, the one or more acrylics can be present in an amount of from about 25 weight %, about 30 weight %, about 40 weight %, or about 50 weight % to about 60 weight %, about 65 weight %, about 70 weight %, about 75 weight %, about 85 weight %, or about 95 weight %, based on a total weight of the anti-corrosive coating formulation.

Polyurethanes comprise, for example, a polyurethane of Formula (II):

(where x is an integer between about 10 and about 10,000). Each instance of $R^1$, $R^2$, $R^3$, $R^4$, and $R^5$ is independently hydrogen or C1-C20 alkyl. Polyurethanes comprise Aptek 2100 AB and Aerodur 3002 (available from Argosy International, Inc.). Polyurethanes are unsubstituted, monosubstituted, or multiplysubstituted (e.g., disubstituted, tri substituted, or tetrasubstituted) where each instance of substitution is independently alkyl (e.g., C1-C20 alkyl), aryl, amino, nitro, or halo (—F, —Cl, —Br, —I).

The one or more polyurethanes can be present in an amount of from about 25 weight % to about 95 weight %, based on a total weight of the anti-corrosive coating formulation. For example, the one or more polyurethanes can be present in an amount of from about 25 weight %, about 30 weight %, about 40 weight %, or about 50 weight % to about 60 weight %, about 65 weight %, about 70 weight %, about 75 weight %, about 85 weight %, or about 95 weight %, based on a total weight of the anti-corrosive coating formulation.

Polysiloxanes, comprise, for example, a polysiloxane of Formula (III):

(where x is an integer between about 10 and about 10,000). Each instance of R1 and R2 is independently hydrogen or C1-C20 alkyl. Polysiloxanes may include EPOTUF 742 available from Berger paints EMIRATES LTD CO (LLC), Abu Dhabi, UAE, or PSX 700 available from PPG Industries, Inc., Pittsburgh, PA 15272 USA. Polysiloxanes are unsubstituted, monosubstituted, or multiplysubstituted (e.g., disubstituted, trisubstituted, or tetrasubstituted) where each instance of substitution is independently alkyl (e.g., C1-C20 alkyl), hydroxyl, aryl, amino, nitro, or halo (—F, —Cl, —Br, —I).

The one or more polyurethanes can be present in an amount of from about 25 weight % to about 95 weight %, based on a total weight of the anti-corrosive coating formulation. For example, the one or more polyurethanes can be present in an amount of from about 25 weight %, about 30 weight %, about 40 weight %, or about 50 weight % to about 60 weight %, about 65 weight %, about 70 weight %, about 75 weight %, about 85 weight %, or about 95 weight %, based on a total weight of the anti-corrosive coating formulation.

Polycarbonates, comprise, for example, a polycarbonate of Formula (IV):

(where x is an integer between about 10 and about 10,000). Each instance of $R^1$ and $R^2$ is independently hydrogen or C1-C20 alkyl. Polycarbonates are unsubstituted, monosubstituted, or multiplysubstituted (e.g., disubstituted, trisubstituted, or tetrasubstituted) where each instance of substitution is independently alkyl (e.g., C1-C20 alkyl), hydroxyl, aryl, amino, nitro, or halo (—F, —Cl, —Br, —I).

The one or more polycarbonates can be present in an amount of from about 25 weight % to about 95 weight %, based on a total weight of the anti-corrosive coating formulation. For example, the one or more polycarbonates can be present in an amount of from about 25 weight %, about 30 weight %, about 40 weight %, or about 50 weight % to about 60 weight %, about 65 weight %, about 70 weight %, about 75 weight %, about 85 weight %, or about 95 weight %, based on a total weight of the anti-corrosive coating formulation.

In at least one aspect, the electrically conductive polymer is a polyaniline (PAM), a poly(ethylenedioxythiophene) (PEDOT), a polypyrrole (Ppy), and copolymers, composites, or composites thereof. Electrically conductive polymers or electrically conducting polymers may also be referred to as intrinsically conductive polymers (ICPs), and generally include organic polymers that conduct electricity. The present disclosure involves electrically conductive polymers that may include a grafted polymer component or other compound grafted to a polymer to synthesize a grafted electrically conductive polymer.

The electrically conductive polymer may comprise between about 0.1 weight percent (wt %) and about 25 wt % of the material. In at least one aspect, an electrically conductive polymer may comprise between about 20 wt % and about 80 wt % of a first polymer, such as between about 40 wt % and about 60 wt %, for example about 40 wt %, about 45 wt %, about 50 wt %, about 55 wt %, about 60 wt %.

In exemplary examples of the present disclosure, the electrical conductivity of the resulting anti-corrosive coating formulation or anti-corrosive coating composition may be between $10^{-14}$ to $10^1$ S m$^{-1}$.

Polyanilines comprise, for example, a polyaniline of Formula (V):

(where x is a positive integer, such as between about 10 and about 10,000), leucoemeraldine, emeraldine, and (per) nigraniline, mixtures thereof, salts thereof, and bases thereof. Polyanilines are unsubstituted, monosubstituted, or multiplysubstituted (e.g., disubstituted, tri substituted, or tetrasubstituted) where each instance of substitution is independently alkyl (e.g., C1-C20 alkyl), aryl, amino, nitro, or halo (—F, —Cl, —Br, —I). With polyanilines, the emeraldine salt form is conducting while the emeraldine blue base form is insulating, as the polyanilines may participate in re-dox reactions when added to anti-corrosive coating compositions.

Polypyrroles comprise, for example, a polypyrrole of Formula (VI):

(where x is a positive integer, such as between about 10 and about 10,000), doped, compositions, undoped compositions, or mixtures thereof.

Poly(ethylenedioxythiophene)s comprise, for example, a poly(ethylenedioxythiophene) of the Formula (III):

(where x is a positive integer, such as between about 10 and about 10,000) and/or salts thereof Poly(ethylenedioxythiophene)s are unsubstituted, monosubstituted, or multi ply substituted (e.g., disubstituted, trisubstituted, or tetrasubstituted) where each instance of substitution is selected from alkyl (e.g., C1-C20 alkyl), aryl, amino, nitro, and halo (—F, —Cl, —Br, —I).

Exemplary reactions for synthesizing conductive polymers as described herein are known to those skilled in the art in particular regarding the details and processing considerations thereof. In synthesizing polyaniline, reaction conditions include maintaining a pH of about 1-3, a temperature of about 0 to about 5° C., a polymerization duration of from about 2 to about 5 hours, with filtering and washing with water and/or ethanol, while drying at about 70 to about 75° C. Exemplary reactions for synthesizing polypyrrole (Ppy) include maintaining a pH of about 4 to about 6, a temperature of about 4 to about 6° C., a polymerization duration of about 2 to about 5 hours, filtering and washing with water and/or ethanol, while drying in air at ambient conditions.

Exemplary reactions for synthesizing poly(3,4-ethylenedioxythiophene) include maintaining a pH of about 1 to about 3, a temperature of about 15 to about 20° C., a polymerization duration of about 15 to about 20 hours, filtering and washing with water and/or ethanol, while drying in air at ambient conditions.

Conductive polymers, of the present disclosure may be commercially available or may be synthesized by mixing a plurality of monomers to form a mixture, followed by applying heat or alternatively adding an oxidizing agent to polymerize the monomers. One or more polymerization catalysts may be added to a mixture to promote increased molecular weight (Mn and/or Mw) of a formed polymer. "Mn" is a number average molecular weight, and "Mw" is a weight average molecular weight. In at least one aspect, polymers are synthesized in any suitable solvent or solvent mixture, for example, n-butanol, n-hexanol, diethyl ether, or mixtures thereof. Certain materials of the present disclosure produce polymers having a high molecular weight (e.g., >22,000) and a moderate conductivity (10-5 S/cm) and exhibits high solubility in a variety of solvents. In at least one aspect, the conductivity of materials of the synthesized polymers may be enhanced by about 5 orders of magnitude by treatment/rinsing with quaternary ammonium salts or solvents such as methanol, acetone, isopropyl alcohol, p-toluenesulfonic acid, salts thereof, and mixtures thereof. Without being bound by theory, conductivity increases with rinsing due to removal of excess sulfonic acid, densification of the polymer, and a resultant increase in crystallinity.

Implementations of the present disclosure include one or more reaction steps provided to embed one or more of the electrically conductive polymers as described herein within the binder resin or base polymer of the anti-corrosive coating composition. This embedding or incorporation of the conductive polymer within the binder resin throughout the bulk of the anti-corrosive coating increases the self-healing nature of the anti-corrosive coating composition throughout the coating system. While not being bound by any particular theory, in the example of polyaniline incorporated into an epoxy resin, a pedant functional group on the epoxy resin, such one or more epoxy group, may chemically bond with one or more functional groups pedant on the polyaniline polymer chain, such as an amine-functional group or other pendant group that may be incorporated into the polyaniline molecule. Additional catalysts, reactants, or additives to such a reaction may be employed to this incorporation reaction and would be known to those skilled in the art. This and similar reactions with other conductive polymers and binder resins as described herein may be used in the formulation and fabrication of the anti-corrosive coating compositions. These alternate reactions to embed a conductive polymer into a binder resin are possible via paired corresponding chemical functionality between a particular electrically conductive polymer and a particular binder resin selected for the anti-corrosive coating composition. Further customization or tunability of electrical properties might be realized by a selection of various dopants to the electrical conducting polymer as required based on the application of the anti-corrosive coating composition. This initial reaction to chemically combine the electrically conductive composition with the binder resin as a separate procedural step retains the conjugated structure within the conducting polymer chain, which is not preserved when similar components are blended or mixed directly during formulation. Advantages of such an incorporation are that the conductive polymer component is more evenly distributed throughout the coating system, resulting in the flexibility of localized self-healing action within the anti-corrosive coating composition, capability to load required dopants within the polymer chain, and minimization of the solid content of the anti-corrosive coating compositions. Self-healing properties of anti-corrosive coating formulations herein are associated with the additives and conductive polymers being homogenously distributed throughout the anti-corrosive coating composition and the self-healing nature of the anti-corrosive coating composition self-healing is accomplished by providing an electrically conductive polymer throughout the bulk of the coating thickness that is chemically crosslinked with the binder. In certain examples, the electrically conducting polymer is chemically cross-linked with the binder. In certain additional examples, the electrically conducting grafted polymer is chemically cross-linked with the binder In addition to the electrically conductive polymers noted herein, modifications to the electrically conductive polymers, via chemical grafting, for example, may be employed to further tailor or modify the electrically conductive polymers for the purpose of tailoring chemical, electrical, or physical properties prior to the electrically conductive polymer addition and incorporation into the binder resin. In certain implementations, the conductive polymer, for example, PANI, Ppy, or PEDOT, is grafted, and therefore combined in a grating additive. In one exemplary example, the conductive polymer is grafted with a biopolymer, such as cellulose or chitosan, for example. As biopolymers are typically environmentally friendly, the grafting of biopolymers onto the conductive polymer to create a grafted conductive polymer provides an environmentally friendly aspect to the anti-corrosive coating composition by improving the addition of coating materials and compatibility. Biopolymers may also add potential sites for side reactions and improved compatibility or curing and crosslinking between the biopolymer-based conductive additives and binder resins. IN other examples of the present disclosure, conductive polymers may be grafted with a polyethylene oxide (PEO), styrenesulfonic acid, N,N-dimethylacrylamide (DMAA), acrylic acid with or without a sodium styrene sulfonate (NaSS), or one or more silanes.

Silanes or organosilanes are generally understood to be, but not necessarily limited to, multifunctional silicon-containing molecules that include a reactive functional group and one or more hydrolysable alkoxy group. Illustrative silanes can include, but are not limited to, bis(trimethoxysilylethyl)benzene, bis(triethoxysilylethyl)benzene, 3-Acryloxypropyltrimethoxysilane, 3-Methacryloxypropyltrimethoxysilane, aminopropyltrimethoxysilane, vinyl trimethoxysilane, allyl trimethoxysilane, or combinations thereof. Illustrative glycidoxy functional or epoxy functional silanes may include, but are not limited to, glycidoxypropyltrialkoxysilane (such as glycidoxypropyltrimethoxysilanes, 3-glycidoxypropyltrimethoxysilane, 3-glycidoxypropyltriethoxysilane, and the like), 3-(2,3-epoxypropoxypropyl)methyldiethoxysilane, 2-(3,4-epoxycyclohexyl)ethyltrimethoxysilane, 3-(2,3-epoxypropoxypropyl)methyldimethoxysilane, 2-(3,4-epoxycyclohexyl)ethylmethyldimethoxysilane, 8-glycidoxyoctyltrimethoxysilane, 1-(3-glycidoxypropyl)-1,1,3,3,3-pentaethoxy-1,3-di silapropane, and combinations thereof. Illustrative mercapto functional silanes may include, but are not limited to, 3-mercaptopropyltriethoxysilane, 3-mercaptopropyltrimethoxysilane, 11-mercaptoundecyltrimethoxysilane, s-(octanoyl)mercaptopropyltriethoxysilane, (mercaptomethyl)methyldiethoxysilane, 3-mercaptopropylmethyldimethoxysilane, mercaptopropyltrialkoxysilanes (such as mercaptopropyltrimethoxysilanes 3-Mercaptopropyltrimethoxysilane), mercaptoundecyltrimethoxysilane, (mercaptomethyl)methyldiethoxysilane, and combinations thereof.

Once the electrically conductive polymer or grafted electrically conductive polymer is incorporated into the binder resin, a crosslinker or hardener may be added to the precursor or composition to initiate curing between one or more of the disclosed grafted polymers and binder resin. Upon application of the anti-corrosive coating composition, the cured polymer network will have a dispersed electrically conductive network throughout the coating which provides the self-healing corrosion protection throughout the bulk of the anti-corrosive coating thickness. Various reaction processes or techniques may be utilized for grafting or embedding the conducting polymer into the base polymer or binder resin. These techniques include oxidative polymerization of biopolymer grafted conducting polymer, solvent assisted electrospinning processes, alkene-azide reaction mechanisms, atom transfer radical polymerization, catalyst-transfer polycondensation polymerization, dual initiation polymerization, or combinations thereof.

The one or more organic solvents used in the anti-corrosive coating composition can be capable of or configured to disperse, solubilize, solvate, or otherwise dissolve one or more substances or components of the anti-corrosive coating composition. The one or more organic solvents of the anti-corrosive coating composition can also be capable of or configured to disperse, solubilize, solvate, or otherwise dissolve one or more substances, such as greases, oils, or debris, on surfaces contacted with the anti-corrosive coating composition. For example, the one or more organic solvents of the adhesion promoter composition can be capable of or configured to dissolve the one or more silanes, the one or more binder resins, the one or more conductive polymers, the one or more functional additives, or combinations thereof.

The one or more organic solvents can be or include, but are not limited to, aliphatic hydrocarbons, aromatic compounds, such as aromatic hydrocarbons, halogenated hydrocarbons, nitrated hydrocarbons, ketones, amines, esters, alcohols, aldehydes, ethers, or the like, or combinations thereof.

Additional solvents present in the anti-corrosive coating composition may include N-methyl-2-pyrrolidone (NMP), N-methyl-2-pyrrolidone, water, or combinations thereof.

Illustrative aliphatic hydrocarbon that can be utilized as the one or more organic solvents can be or include, but are not limited to, n-pentane, n-hexane, n-octane, n-nonane, n-decane, or homologues thereof, 2,2,4-trimethyl pentane, cyclohexane, or the like, or any combination thereof.

Illustrative aromatic compounds that can be utilized as the one or more organic solvents can be or include, but are not limited to, benzene, toluene, ethylbenzene, xylene, tetralin, hexafluoro xylene, or the like, or any combination thereof.

Illustrative halogenated hydrocarbons that can be utilized as the one or more organic solvents can be or include, but are not limited to, chloroform, methylene chloride, trichloro ethylene, dichloromethane, or the like, or combinations thereof.

Illustrative ketone organic solvents can be or include, but are not limited to, acetone, methyl ethyl ketone (MEK), diethyl ketone, methyl propyl ketone (MPK), dipropyl ketone, methyl isobutyl ketone (MIBK), cyclopentanone, cyclohexanone, methyl amyl ketone, n-methyl-2-pyrrolidone, diisobutyl ketone, acetophenone, or the like, or combinations thereof.

Illustrative esters that can be utilized as the one or more organic solvents can be or include, but are not limited to, methyl acetate, ethyl acetate, isopropyl acetate, n-butyl acetate, cellosolve acetate, or the like, or combinations thereof.

Illustrative alcohols that can be utilized as the one or more organic solvents can be or include, but are not limited to, methanol, ethanol, n-propanol, i-propanol, n-butanol, i-butanol, s-butanol, n-amyl alcohol, i-amyl alcohol, cyclohexanol, n-octanol, ethanediol, diethylene glycol, 1,2-propanediol, or the like, or combinations thereof.

Illustrative ethers that can be utilized as the one or more organic solvents can be or include, but are not limited to, diethyl ether, diisopropyl ether, dibutyl ether, methyl tert butyl ether, 1,4-dioxane, tetrahydrofuran, oligomers of perfluoropolyethers, such as the GALDEN® line, which is commercially available from Solvay of Houston, TX, or the like, or combinations thereof.

The amount of the one or more organic solvents present in the anti-corrosive coating composition can be from about 75 weight % to about 99.5 weight %, based on a total weight of the anti-corrosive coating composition. For example, the amount of the one or more organic solvents present in the anti-corrosive coating compositions can be from about 75 weight %, about 80 weight %, about 85 weight % or about 90 weight % to about 95 weight %, about 98 weight %, about 99 weight %, or about 99.5 weight %, based on a total weight of the anti-corrosive coating composition. In another example, the amount of the one or more organic solvents present in the anti-corrosive coating composition may be from about 75 weight % to about 99.5 weight %, about 80 weight % to about 99 weight %, about 85 weight % to about 95 weight %, or about 85 weight % to about 90 weight %, based on a total weight of the anti-corrosive coating composition. In another example anti-corrosive coating composition, the solvent can be present in an amount of from about 25 weight %, about 30 weight %, about 35 weight %, or about 40 weight %, based on a total weight of the anti-corrosive coating composition. In another example, the solvent can be present in an amount of from about 25 weight % to about 40 weight %, about 25 weight % to about 30 weight %, or about 30 weight % to about 40 weight %.

The anti-corrosive coating composition can include one or more optional functional additives capable of or configured to provide additional functional properties to the anti-corrosive coating composition. These functional additives may include one or more of several visual indicators, wetting agents, anti-foaming agents, inorganic fillers, leveling agents, or any combination thereof. Examples of optional functional additives referred to herein are discussed further in turn below. The optional functional additives may be combined with the anti-corrosive coating composition to add one or more functionalities alone or in combination with other additives for further functionalities.

The one or more indicators or visual indicators can be capable of or configured to facilitate, promote, or provide identification of an area or surface coated with the anti-corrosive coating composition. For example, the visual indicators can be capable of or configured to allow a user to identify what surfaces or areas have been treated by the anti-corrosive coating composition in varying environments (e.g., low light, confined space, etc.). The one or more indicators can be or include, but are not limited to, one or more dyes, pigments, ultraviolet (UV) indicators, or the like, or combinations thereof. The one or more indicators can be visible in the visible spectrum (wavelength of 380 nm to 700 nm), the UV spectrum (wavelength of 10 nm to 380 nm), or combinations thereof. The one or more indicators can absorb in the UV spectrum and emit in the visible spectrum. Said in another way, the visual indicator can absorb energy in the ultraviolet spectrum, and the visual indicator can emit energy in the visible spectrum. The one or more indicators can include one or more fluorescent compounds, phosphorescent compounds, or combinations thereof.

Illustrative indicators can be or include, but are not limited to, a proprietary blend of Chromate(2-), [4-[(5-chloro-2-hydroxy-3-nitrophenyl)azo]-2,4-dihydro-5-methyl-2-phenyl-3H-pyrazol-3-onato(2-)][3-[[1-(3-chlorophenyl)-4,5-dihydro-3-methyl-5-oxo-1H-pyrazol-4-yl]azo]-4-hydroxy-5-nitrobenzenesulfonato(3-)]-, di sodium, 1-methoxy-2-propanol, 1,2-propanediol, and 2-methoxypropanol, a crimson red solvent based red liquid dye commercially available from KEDA™ Dye of Manitowoc, WI, Triple Glow Powder commercially available from GLONATION of Falmouth, KY, or the like, or combinations thereof.

The one or more indicators can be present in an amount of from about 0.01 weight % to about 5 weight %, based on a total weight of the anti-corrosive coating composition. For example, the one or more indicators can be present in an amount of from about 0.01 weight %, about 0.05 weight %, about 0.1 weight %, about 0.5 weight %, about 1 weight %, about 2 weight %, or about 2.5 weight % to about 3 weight %, about 3.5 weight %, about 4 weight %, about 4.5 weight %, or about 5 weight %, based on a total weight of the anti-corrosive coating composition. In another example, the one or more indicators can be present in an amount of from about 0.01 weight % to about 5 weight %, about 2 weight % to about 4 weight %, or about 3 weight % to about 3.5 weight %, based on a total weight of the anti-corrosive coating composition.

The anti-corrosive coating composition can include one or more inorganic fillers. The one or more inorganic fillers can be capable of or configured to reinforce or modify the physical properties of the anti-corrosion coating composition. Illustrative inorganic fillers of the anti-corrosive coating composition can be or include, but are not limited to, silica or silicon dioxide, alumina, hydrated alumina, silicates (e.g., zirconium silicate, aluminum silicate including calcined aluminum silicate), talc, sand, glass particles, aluminosilicates, barium sulfate, mica, diatomites, calcium carbonate, calcium sulfate, carbon, wollastonite, metaphosphate compounds, phosphate salts (e.g., insoluble phosphate salts), such as sodium metaphosphate, potassium metaphosphate, calcium pyrophosphate, magnesium orthophosphate, trimagnesium orthophosphate, tricalcium phosphate, dicalcium phosphate dihydrate, anhydrous dicalcium phosphate, calcium carbonate, magnesium carbonate, titanium dioxide, aluminum stearate or the like, or combinations thereof.

The one or more inorganic fillers can be present in an amount of from about 0.1 weight % to about 10 weight %, based on a total weight of the anti-corrosive coating composition. For example, the one or more inorganic fillers can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the anti-corrosive coating composition. In another example, the one or more inorganic fillers can be present in an amount of from about 0.1 weight % to about 10 weight %, about 2 weight % to about 8 weight %, or about 4 weight % to about 6 weight %.

The anti-corrosive coating composition can include one or more of a wetting agent, anti-foaming agent, or leveling agent. A wetting agent or leveling agent may refer to a surfactant, or a surface-active molecule used to reduce the surface tension between one or more components of a coating formulation or dispersion, surface tension between a coating formulation and a surface or substrate to which it may be applied, or a combination thereof. Illustrative wetting agents or leveling agents of the anti-corrosive coating composition can be or include, but are not limited to, non-ionic ethoxylated alcohols, non-ionic surfactants such as sodium dodecyl sulfate (SDS), fluorinated surfactants, alkoxylate-functional surfactants, sulfosuccinate-functional surfactants, or combinations thereof. An anti-foaming agent, defoamer, or foam control agent may refer to a coating additive used to reduce or hinder the formation of foam during mixing and handling of a coating formulation. Illustrative anti-foaming agents of the anti-corrosive coating composition can be or include, but are not limited to, silicones, oils, alcohols, stearates, glycols, silicone-based additives, insoluble oils, polydimethylsiloxanes and other silicones, stearates, glycols, or combinations thereof.

The one or more wetting agents, anti-foaming agents, or leveling agents can be present in an amount of from about 0.1 weight % to about 10 weight %, based on a total weight of the anti-corrosive coating composition. For example, the one or more wetting agents, anti-foaming agents, or leveling agents can be present in an amount of from about 0.1 weight %, about 0.5 weight %, about 1 weight %, about 1.5 weight %, about 2 weight %, about 3 weight %, about 4 weight %, or about 5 weight % to about 6 weight %, about 6.5 weight %, about 7 weight %, about 8 weight %, about 9 weight %, or about 10 weight %, based on a total weight of the anti-corrosive coating composition. In another example, the one or more wetting agents, anti-foaming agents, or leveling agents can be present in an amount of from about 0.1 weight % to about 10 weight %, about 2 weight % to about 8 weight %, or about 4 weight % to about 6 weight %.

As used herein, "free" or "substantially free" of a material can refer to a composition, component, or phase where the material is present in an amount of less than 10.0 weight %, less than 5.0 weight %, less than 3.0 weight %, less than 1.0 weight %, less than 0.1 weight %, less than 0.05 weight %, less than 0.01 weight %, less than 0.005 weight %, or less than 0.0001 weight % based on a total weight of the composition, component, or phase.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +/−5% of a stated target value, maximum, or minimum value.

All references cited herein are hereby incorporated by reference in their entireties. In the event of a conflict in a definition in the present disclosure and that of a cited reference, the present disclosure controls.

Methods

Figure 2:
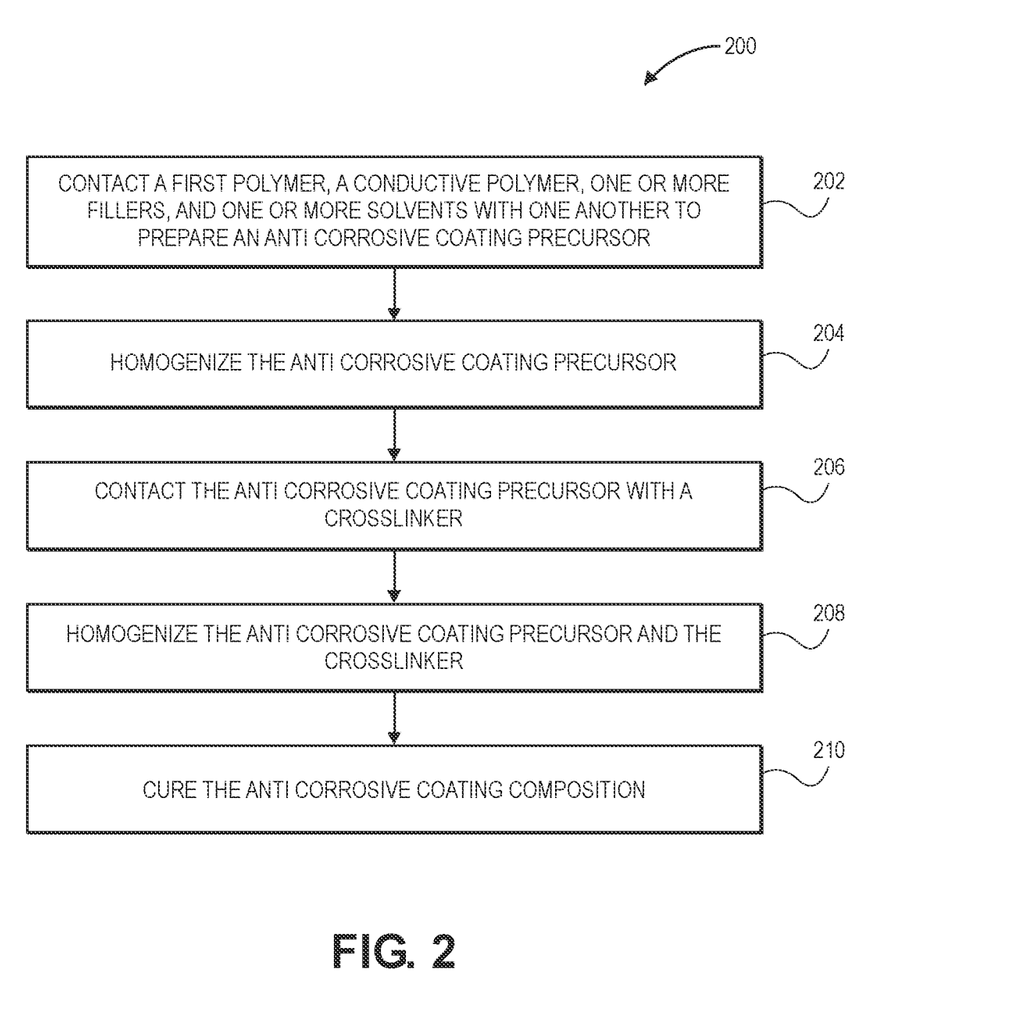
FIG. 2 is a flowchart illustrating a method of fabricating an anti-corrosive coating composition, in accordance with the present disclosure.

FIG. 2 is a flowchart illustrating a method of fabricating an anti-corrosive coating composition, in accordance with the present disclosure. Methods for preparing any one or more of the anti-corrosive coating compositions disclosed herein are provided. The method for making an anti-corrosive coating composition 200 can include contacting a first polymer, a conductive polymer, one or more fillers, and one or more solvents with one another to prepare an anti-corrosive coating precursor 202 as a mixture. This initial step in the method for making an anti-corrosive coating composition 200 may alternately include grafting a second polymer to the conductive polymer prior to contacting the first polymer. In certain examples, the second polymer is a biopolymer. Examples of suitable biopolymers have been described previously herein. The next step in the method for making an anti-corrosive coating composition 200 method for making an anti-corrosive coating composition 200 includes a step to homogenize homogenizing the anti-corrosive coating precursor 204, followed by a step to contacting the anti-corrosive coating precursor with a crosslinker 206. A next step in the method for making an anti-corrosive coating composition 200 is homogenizing the anti-corrosive coating precursor and the crosslinker 208. The last step in the method for making an anti-corrosive coating composition 200 is to cure the anti-corrosive coating composition 210. In certain examples of the method for making an anti-corrosive coating composition 200 according to the present disclosure, the curing is accomplished by heating the anti-corrosive coating composition. Alternatively, the curing of the anti-corrosive coating composition may be brought about by drying the anti-corrosive coating composition in air, providing UV radiation to the anti-corrosive coating composition, or a combination thereof of any of the previously described curing means.

It should be appreciated that the order of mixing or contacting each of the components of the anti-corrosive coating composition can be at least partially determined by the specific components selected. The method for making the anti-corrosive coating composition 200 may include pausing after homogenizing the anti-corrosive coating precursor or the crosslinker to allow the anti-corrosive coating composition time to pre-react in solution. The method for making the anti-corrosive coating composition may be followed by an additional application method, but is not limited to, where the anti-corrosive coating is used as a corrosion protective coating applied to a substrate, where the substrate is aluminum, magnesium, a polymer composite, steel, stainless steel, other commonly used surface metals, or a combination thereof. Applications include vehicles or vehicle components in the marine, aerospace, automotive, or other industries.

It should be noted that the step of allowing the curing of the anti-corrosive coating composition 210 may include a period of from about 5 seconds (sec), about 10 sec, about 30 sec, or about 1 min to about 2 min, about 3 min, about 5 min, about 10 min, about 30 min, 60 min, or greater. Drying the anti-corrosive coating composition may include drying at ambient conditions, which may be understood to mean temperatures between 50° F. and 100° F. and humidity levels between 0 and 95% relative humidity. The anti-corrosive coating composition may then be allowed to dry over a time frame of approximately 1 min-60 min, or greater. In certain examples, heat curing may be conducted within temperature ranges of from about 40 to about 120° C., at times of from about 30 min to about 4 days. In still other examples, the anti-corrosive coating composition may be cured under ambient conditions or room temperature from about 30 min to about 14 days, or using ultraviolet (UV) curing at any UV frequency, from about 30 min to about 1 day.

The method can further include combining, mixing, blending, or otherwise contacting the mixture or precursor with one or more of a functional additives, wetting agent, surfactant, solvent, or any additional component of an anti-corrosive composition as described herein. It should be appreciated that the steps of the method for making the anti-corrosive coating composition 200 may be conducted in alternate order depending on the specific nature of the application of use, components included, or substrate to which the anti-corrosive formulation is applied.

Methods for applying the anti-corrosive coating composition may include steps where the anti-corrosive coating composition can be homogenized, for example, in a centrifugal mixer, in the presence of one or more particles. Illustrative particles can be or include, but are not limited to, one or more glass particles, ceramic particles, or the like, or any combination thereof. The method can further include separating the one or more particles and/or relatively larger polymer agglomerations from the anti-corrosive coating composition after homogenization. For example, the method can include separating the particles and/or relatively larger polymer or additive agglomerations from the anti-corrosive coating composition via filtration. Filtration can include passing the anti-corrosive coating composition including the one or more particles (e.g., glass particles) and/or the relatively larger polymer agglomerations through a filter having a pore size less than about 1 mm, less than about 0.5 mm, less than about 0.25 mm, or less than about 0.1 mm.

Methods for utilizing any one or more of the anti-corrosive coating compositions disclosed herein to apply to a surface are provided. The surface can be, but is not limited to, any surface or substrate within a vehicle, such as an airplane interior to be treated with an anti-corrosive coating composition. Surfaces may include but are not limited to those mentioned herein, or anodized metals, such as aluminum or titanium, carbon fiber composites, carbon fiber reinforced composites, thermoplastics, or combinations thereof. For example, the surface can be a surface of an external area of a structure, support column, construction object, building, vehicle, such as an atmospheric vehicle, aircraft, bus, train, an aerospace vehicle, an unmanned vehicle, an aircraft, a spacecraft, a satellite, a rocket, a missile, or the like, or any components thereof. These substrates or surfaces may include a metal, an alloy of one or more metals, a polymer, copolymer, polymer composite, or combination thereof.

The method for utilizing the anti-corrosive coating composition to coat or treat a surface can include applying or contacting the anti-corrosive coating composition with the surface. The anti-corrosive coating composition can be contacted with the surface via a brush, a roller, an extrusion gun, a spray gun, misting spray, wiping, either by wetting a wiper with a solution of coating or by applying with one or more pre-saturated wipers at a point of use, or the like, or any combination thereof. The anti-corrosive coating composition disclosed herein may be capable of or configured to concurrently or simultaneously clean the surface, thereby requiring no mechanical processing of the substrate and effectively eliminating additional or optional steps in conventional methods of preparing the surface for the application of an anti-corrosive coating composition. Alternatively, substrate cleaning with one or more solvents, surfactants, degreasers, or a combination thereof may be used to prepare the surface. The method for utilizing the anti-corrosive coating composition to treat the surface can include evaporating the one or more solvents of the anti-corrosive coating composition. The method can further include pausing after applying the anti-corrosive coating composition to the substrate to allow the anti-corrosive coating composition time to react with the substrate.

Non-limiting examples for uses of materials of the present disclosure comprise uses as anti-corrosive protective coating for metallic substrates, or other substrates susceptible to corrosion or corrosive elements based on one or more electrochemical mechanisms. For such substrates, materials of the present disclosure may be disposed on and/or in substrate materials composed of steel, stainless steel, aluminum, iron, magnesium, or alloys thereof, among others. An anti-corrosive coating composition may be disposed on a vehicle or vehicle component subject to service in a marine environment or other corrosive environment.

Additional deposition or coating application methods may include, but are not limited to, flow-coating, dipping, spraying, brush coating, spin coating, roll coating, doctor-blade coating, and mixtures thereof. Materials of the present disclosure are deposited to form a layer on a substrate, such as a layer on a surface of a vehicle component and/or vehicle surface, at a range of thicknesses, such as between about 0.1 µm and about 20 mm, such as between about 1 µm and about 15 such as between about 1 µm and about 8 such as between about 2 µm and about 6 Material thickness is utilized to tune conductivity and resistance of a deposited material. Material thickness may also be utilized to further tune other properties such as rain erosion and resistance to sand and hail damage of the material and resulting coated substrate.

After a material is sprayed, applied, or otherwise deposited onto a substrate, the material is cured at any suitable temperature, e.g. to evaporate solvent. Curing may be performed using any suitable curing apparatus. For curing, a temperature of the material may be raised gradually to a peak curing temperature at which the peak curing temperature remains constant for a period of time. A peak curing temperature may be between about room temperature and about 200° C., such as between about 70° C. and about 150° C. Materials may be cured for a period of time of between about 1 second and about 48 hours, such as between about 1 minute and about 10 hours.

The preceding description of various aspect(s) is merely exemplary in nature and is in no way intended to limit the disclosure, its application, or uses.

As used throughout this disclosure, ranges are used as shorthand for describing each and every value that is within the range. It should be appreciated and understood that the description in a range format is merely for convenience and brevity, and should not be construed as an inflexible limitation on the scope of any examples or implementations disclosed herein. Accordingly, the disclosed range should be construed to have specifically disclosed all the possible subranges as well as individual numerical values within that range. As such, any value within the range can be selected as the terminus of the range. For example, description of a range such as from 1 to 5 should be considered to have specifically disclosed subranges such as from 1.5 to 3, from 1 to 4.5, from 2 to 5, from 3.1 to 5, etc., as well as individual numbers within that range, for example, 1, 2, 3, 3.2, 4, 5, etc. This applies regardless of the breadth of the range.

Unless otherwise specified, all percentages and amounts expressed herein and elsewhere in the specification should be understood to refer to percentages by weight of total solids. The amounts given are based on the active weight of the material.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges, whether "about" is used in conjunction therewith. It should also be appreciated that the term "about," as used herein, in conjunction with a numeral refers to a value that can be ±0.01% (inclusive), ±0.1% (inclusive), ±0.5% (inclusive), ±1% (inclusive) of that numeral, ±2% (inclusive) of that numeral, ±3% (inclusive) of that numeral, ±5% (inclusive) of that numeral, ±10% (inclusive) of that numeral, or ±15% (inclusive) of that numeral. It should further be appreciated that when a numerical range is disclosed herein, any numerical value falling within the range is also specifically disclosed.

The present disclosure has been described with reference to exemplary implementations. Although a limited number of implementations have been shown and described, it will be appreciated by those skilled in the art that changes can be made in these implementations without departing from the principles and spirit of the preceding detailed description. It is intended that the present disclosure be construed as including all such modifications and alterations insofar as they come within the scope of the appended claims or the equivalents thereof.

What is claimed is:

1. A self-healing anti-corrosive coating composition, comprising:
   a binder;
   an electrically conducting polymer comprising a biopolymer grafted to an electrically conductive polymer;
   one or more fillers; and
   a crosslinker; and
   wherein the electrically conducting polymer is chemically crosslinked with the binder, and the biopolymer comprises chitosan.

2. The self-healing anti-corrosive coating composition of claim 1, wherein the binder is an epoxy-functional binder.

3. The self-healing anti-corrosive coating composition of claim 2, wherein the epoxy-functional binder is a bisphenol A diglycidyl ether.

4. The self-healing anti-corrosive coating composition of claim 1, wherein the binder is an acrylic, a polyurethane, a polysiloxane, a polycarbonate, or a combination thereof.

5. The self-healing anti-corrosive coating composition of claim 1, wherein the electrically conductive polymer comprises polyaniline.

6. The self-healing anti-corrosive coating composition of claim 1, wherein the electrically conductive polymer comprises poly(3,4-ethylenedioxythiophene).

7. The self-healing anti-corrosive coating composition of claim 1, wherein the electrically conductive polymer comprises polypyrrole.

8. The self-healing anti-corrosive coating composition of claim 1, wherein the electrically conductive polymer comprises a grafted conductive polymer.

9. The self-healing anti-corrosive coating composition of claim 8, wherein the grafted conductive polymer comprises polyaniline and a silane, an acid, an acrylamide, a nonconductive polymer or a combination thereof.

10. The self-healing anti-corrosive coating composition of claim 1, wherein the one or more fillers are selected from a group consisting of titanium dioxide, talc, mica, silicon dioxide, and aluminum stearate, and combinations thereof.

11. A self-healing anti-corrosive coating composition, comprising:

a binder;

an electrically conducting grafted polymer comprising polyaniline and a biopolymer grafted thereto; and one or more fillers; and wherein the electrically conducting grafted polymer is chemically crosslinked with the binder, and the biopolymer comprises chitosan.

12. The self-healing anti-corrosive coating composition of claim 11, further comprising a silane, an acid, an acrylamide, a non-conductive polymer or a combination thereof.

13. The self-healing anti-corrosive coating composition of claim 11, wherein the one or more fillers are selected from a group consisting of titanium dioxide, talc, mica, silicon dioxide, and aluminum stearate, and combinations thereof.

14. The self-healing anti-corrosive coating composition of claim 11, wherein the grafted conductive polymer further comprises a silane, an acid, an acrylamide, a non-conductive polymer or a combination thereof.

15. The self-healing anti-corrosive coating composition of claim 11, further comprising a crosslinker.

16. A method for making a self-healing anti-corrosive coating composition, comprising: contacting a first polymer, a conductive polymer comprising a chitosan biopolymer and an electrically conductive polymer, one or more fillers, and one or more solvents with one another to prepare an anti-corrosive coating precursor;

homogenizing the anti-corrosive coating precursor;

contacting the anti-corrosive coating precursor with a crosslinker;

homogenizing the anti-corrosive coating precursor and the crosslinker; and curing the anti-corrosive coating composition.

17. The method of claim 16, further comprising grafting the chitosan biopolymer to the conductive polymer prior to contacting the first polymer.

18. The method of claim 16, wherein curing the self-healing anti-corrosive coating composition further comprises heating the self-healing anti-corrosive coating composition, drying the self-healing anti-corrosive coating composition in air, providing UV radiation to the self-healing anti-corrosive coating composition, or a combination thereof.

19. The method of claim 16, wherein the electrically conductive polymer comprises polyaniline.

20. The method of claim 16, wherein the electrically conductive polymer comprises poly(3,4-ethylenedioxythiophene).

* * * * *